US008509105B2

(12) United States Patent
Kneckt et al.

(10) Patent No.: US 8,509,105 B2
(45) Date of Patent: Aug. 13, 2013

(54) METHOD AND APPARATUS FOR DEVICE-TO-DEVICE NETWORK COORDINATION

(75) Inventors: Jarkko Lauri Sakari Kneckt, Espoo (FI); Klaus Franz Doppler, Espoo (FI); Mika Petri Olavi Rinne, Espoo (FI)

(73) Assignee: Nokia Corporation, Espoo (FI)

( * ) Notice: Subject to any disclaimer, the term of this patent is extended or adjusted under 35 U.S.C. 154(b) by 459 days.

(21) Appl. No.: 12/821,966

(22) Filed: Jun. 23, 2010

(65) Prior Publication Data

US 2011/0317569 A1     Dec. 29, 2011

(51) Int. Cl.
*G01R 31/08* (2006.01)

(52) U.S. Cl.
USPC .......................................... 370/252; 370/329

(58) Field of Classification Search
None
See application file for complete search history.

(56) References Cited

U.S. PATENT DOCUMENTS

| | | | | |
|---|---|---|---|---|
| 2003/0181215 | A1* | 9/2003 | Cromer et al. | 455/515 |
| 2007/0211680 | A1 | 9/2007 | Laroia et al. | |
| 2007/0247365 | A1 | 10/2007 | Laroia et al. | |
| 2008/0075059 | A1* | 3/2008 | Kermoal et al. | 370/343 |
| 2008/0165727 | A1* | 7/2008 | Xiaoben et al. | 370/329 |
| 2008/0232311 | A1 | 9/2008 | Reumerman et al. | |
| 2010/0009675 | A1 | 1/2010 | Wijting et al. | |
| 2010/0104238 | A1* | 4/2010 | Vadivelu | 385/12 |
| 2010/0110886 | A1 | 5/2010 | Sorri et al. | |
| 2010/0157910 | A1 | 6/2010 | Nentwig et al. | |
| 2011/0106837 | A1* | 5/2011 | Walton et al. | 707/769 |

FOREIGN PATENT DOCUMENTS

| | | |
|---|---|---|
| GB | 2453936 B | 4/2010 |
| WO | 2008/036660 A2 | 3/2008 |
| WO | 2008-048809 A2 | 4/2008 |
| WO | 2009-044174 A2 | 4/2009 |
| WO | 2009-072089 A1 | 6/2009 |
| WO | 2009-158643 A1 | 12/2009 |

OTHER PUBLICATIONS

International Search Report and Written Opinion, received in corresponding Patent Cooperation Treaty Application No. PCT/IB2011/052144, dated Nov. 8, 2011, 12 pages.

Alnuweiri, H.M., et al., "OFDMA-Based Medium Access Control for Next-Generation WLANs", EURASIP Journal on Wireless Communications and Networking, vol. 2009, 9 pages.

Beyer, Dave, et al., "Tutorial: 802.16 MAC Layer Mesh Extensions Overview", IEEE 802.16, Session 18, http://wirelessman.org/tga/contrib/C802.16a-02_30rl.pdf, Mar. 11, 2002, pp. 47-54.

* cited by examiner

*Primary Examiner* — David Oveissi
(74) *Attorney, Agent, or Firm* — Harrington & Smith

(57) ABSTRACT

In accordance with an example embodiment of the present invention, a method comprises broadcasting from a user equipment (UE) having means for device to device (D2D) communication a beacon comprising an OFDM beacon frame comprising a plurality of beacon fields; receiving at least one random access request from at least one neighbor device to trigger handshake signaling for establishment of a D2D connection; responding to one of the at least one random access request with an acknowledgement beacon including at least an identifier of the UE to confirm the D2D connection with the selected neighbor device; discovering available resources; and exchanging said resource information in the handshake signaling with the neighbor devices.

20 Claims, 8 Drawing Sheets

METHOD AND APPARATUS FOR DEVICE-TO-DEVICE NETWORK COORDINATION

TECHNICAL FIELD

The present application relates generally to a method and apparatus for device-to-device network coordination.

BACKGROUND

A local area evolution (LAE) network is a wireless local area network that supports different connection modes to maximize the connectivity between network devices in a local area. The connection modes may include access point (AP)-facilitated connection mode and ad-hoc, or device-to-device (D2D) connection mode. The devices within an LAE network may be locally synchronized. The local synchronization enables a D2D beaconing and handshake among the devices and the D2D beaconing and handshake with devices in the surrounding LAE networks. The LAE network may support a plurality of frequency bands such as 2.4 GHz and 5 GHz license exempt frequency bands, US TV white space bands, licensed time division duplex (TDD) bands at 3.4-3.8 GHz, 2.5 GHz, and the like. Due to the uncoordinated nature of OLA network, a network self-optimization capability may help distribute resources among devices in a LAE network.

SUMMARY

Various aspects of examples of the invention are set out in the claims.

According to a first aspect of the present invention, a method comprises broadcasting from a user equipment (UE) having means for device to device (D2D) communication a beacon comprising an OFDM beacon frame comprising a plurality of beacon fields; receiving at least one random access request from at least one neighbor device to trigger handshake signaling for establishment of a D2D connection; responding to one of the at least one random access request with an acknowledgement beacon including at least an identifier of the UE to confirm the D2D connection with the selected neighbor device; discovering available resources; and exchanging said resource information in the handshake signaling with the neighbor devices.

According to a second aspect of the present invention, an apparatus comprises at least one processor; and at least one memory including computer program code. The at least one memory and the computer program code are configured to, with the at least one processor, cause the apparatus to perform at least the following: broadcasting from a device to device (D2D) user equipment (UE) a beacon comprising an OFDM beacon frame comprising a plurality of beacon fields; discovering available flexible spectrum usage (FSU) resources; exchanging with the neighbor device information of the discovered available FSU resources; receiving at least one random access request from at least one neighbor device to trigger a handshake signaling session to establish a D2D connection; and responding to one of the at least one random access request with an acknowledgement beacon including at least an identifier of the D2D UE to establish the D2D connection with the selected neighbor device.

According to a third aspect of the present invention, a method comprises receiving at a device to device (D2D) user equipment (UE) a beacon comprising an OFDM beacon frame; sending a random access request to the neighbor device to trigger a handshake signaling session to establish a D2D connection; discovering available flexible spectrum usage (FSU) resources; and exchanging with the neighbor device information of the discovered available FSU resources.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Disclosed herein are a flexible spectrum usage (FSU) resource scheme and an orthogonal frequency division multiplexing (OFDM) beacon frame structure as used in a D2D handshake process to establish a D2D connection. The FSU resource scheme includes a FSU discovery method and FSU signaling and the OFDM beacon frame includes a plurality of uplink and downlink beacon fields arranged in a way that facilitates the D2D connection setup and the FSU resource discovery and allocation An example embodiment of the present invention and its potential advantages are understood by referring to FIGS. 1 through 8 of the drawings.

Figure 1:
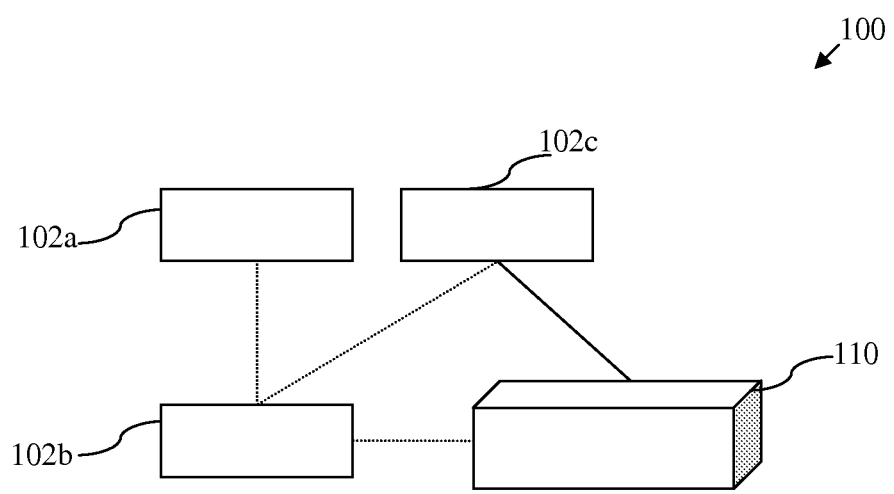
FIG. 1 illustrates an example LAE network in accordance with an example embodiment of the invention.

FIG. 1 illustrates an example wireless local area evolution (LAE) network 100. The example LAE network 100 may include an access point 110, and a set of user equipments (UEs) 102a, 102b and 102c. UE 102a may communicate with UE 102b via a D2D communication link. Similarly, the UEs 102b and 102c may communicate with each other either via a direct D2D communication link or via the access point 110.

In one example embodiment of the OLA network 100, the UEs 102a, 102b and 102c may roam into a conference room for a meeting at approximately same time where the LAE network 100 is available. Each UE may first listen to beacons from neighbor devices such as other UEs and the access point 110. In an example embodiment, each of the UEs is configured to transmit short beacons multiplexed into an OFDM frame. All the UEs may transmit the OFDMA scheme at approximately same time within the cyclic prefix of the OFDM symbol. In the OFDMA scheme, transmission of multiple beacon signals by multiple devices is achieved by each transmitting UE device modulating different subsets of subcarriers. Each UE may receive multiple beacon frames from multiple neighbor devices at approximately same time during beacon opportunities, and soon learn the presence of other UEs without waiting for other UEs to transmit beacons in a sequential manner at arbitrary times. For example, once UE 102a may learn of the presences of other UEs 102b and 102c and the AP 110, it may decide to establish a D2D communication with another UE such as 102b via a handshake procedure and initiate a D2D communication session.

In one example embodiment, after broadcasting a beacon, the UE 102a may receive a random access request from the UE 102b to initiate a D2D connection setup process. The UE 102a may initiate a service discovery process via a service discovery request and the UE 102b may respond to the request with a service capability request acknowledgement including its service capabilities if the UE 102a and UE 102b have not exchanged their capabilities previously. In addition, the UE 102a and the UE 102b may both enter a FSU resource discovery process to identify the available resources if the FSU resource discovery has not been done. After the UE 102a has discovered available resources through the FSU discovery, it may propose the resource to be used for the service. The UE 102a may send a signaling message using an uplink subframe to the UE 102b to request for data exchange method and resources for D2D connection and the UE 102b may respond with a signaling message using a downlink subframe to the UE 102A that contains an acknowledgement to use the proposed data transmission resource and method. The UE 102a may be elected to take on the role of maintaining the resource allocation through FSU beacons and may decide on resources increase or decrease for the D2D link. Once an authentication of each other is performed, the UE 102a and UE 102b may initiate a data exchange session, using the allocated FSU resource.

Figure 2:
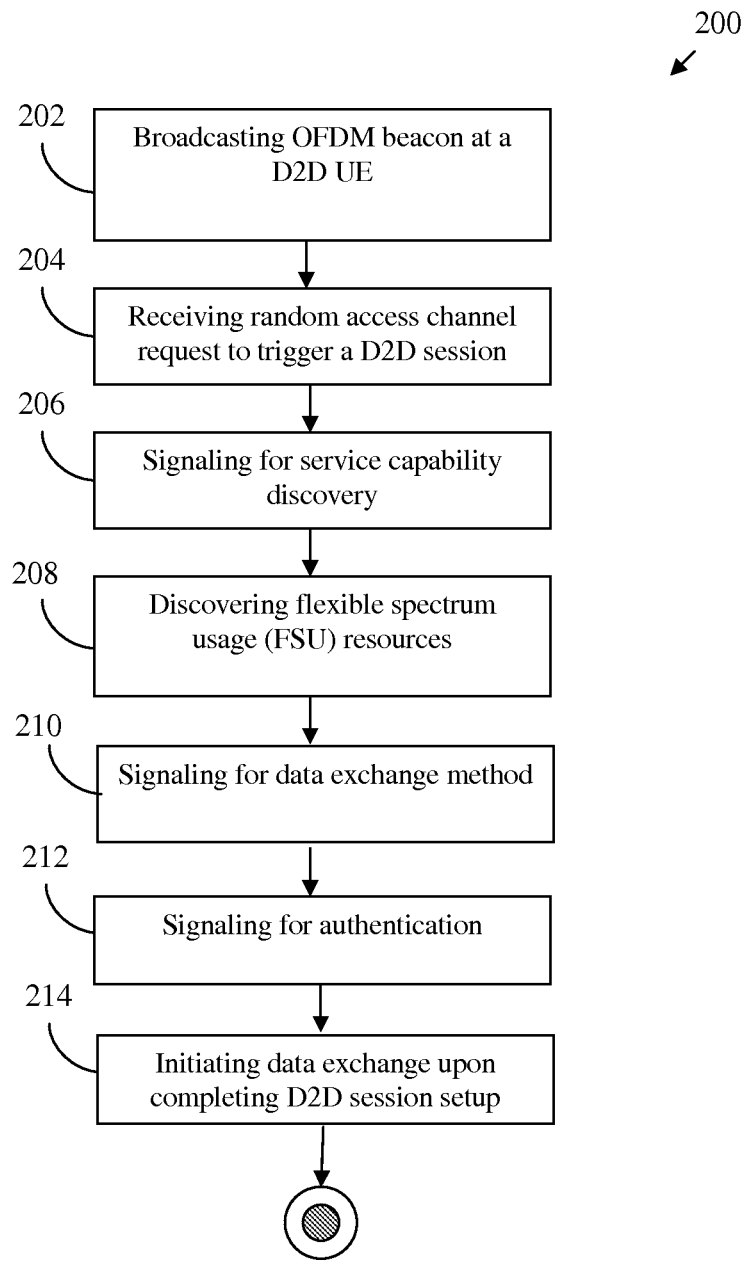
FIG. 2 illustrates an example method for OFDM based signaling for FSU resource discovery in accordance with an example embodiment of the invention.

FIG. 2 illustrates an example method 200 for OFDM beacon signaling for FSU resource discovery in accordance with an example embodiment of the invention. The method 200 includes broadcasting beacons at a D2D device at block 202, receiving a random channel access request from a neighbor device at block 204, and signaling for service capabilities at block 206. The method 200 may also include discovering FSU resources at block 208, and signaling for data exchanging method at block 210. The method 200 also includes signaling for authentication at block 212 and initiating data exchange upon completing the D2D session setup at block 214.

In one example embodiment, broadcasting a beacon at a D2D UE at block 202 may include broadcasting the beacon that includes a beacon frame including a frame type field, and a set of downlink fields and a set of uplink fields. The downlink fields and uplink fields are arranged in such a way that a number of uplink fields are followed by an equal number of downlink fields for efficient beacon processing.

In one example embodiment, receiving a random channel access request from a neighbor device at block 204 may include receiving an access request to trigger a handshake process to set up a D2D session between the D2D UE and the neighbor device. The random channel access request may include a neighbor device identifier and other information about the neighbor device. The receiving D2D UE may send an acknowledgement to the random channel access request to the neighbor device, and the acknowledgement may include a grant to the random channel access request and an identifier of the D2D UE. In one example embodiment, a multiple D2D UEs may be triggered simultaneously. In one example embodiment, a triggering D2D UE may estimate the total resource needed for the application and allocate the estimated resources before triggering multiple D2D connection setup thus, reducing the initiation delay of the application with multiple UEs.

In one example embodiment, signaling for service capabilities at block 206 may include the D2D UE communicating its service capabilities to the neighbor device. The D2D UE may initiate a request for the service capabilities of the neighbor device. The D2D UE may include its own service capabilities in the request and the neighbor device may respond with an acknowledgment including its service capabilities. Service capabilities may include supported transport services, network service, and various supported applications. In an alternative embodiment, the triggering neighbor device may initiate the service discovery and the D2D UE may respond to the request from the triggering neighbor device for service capabilities. The steps for service discovery are optional, because the service capability information may have been exchanged in a prior session.

Figure 5:
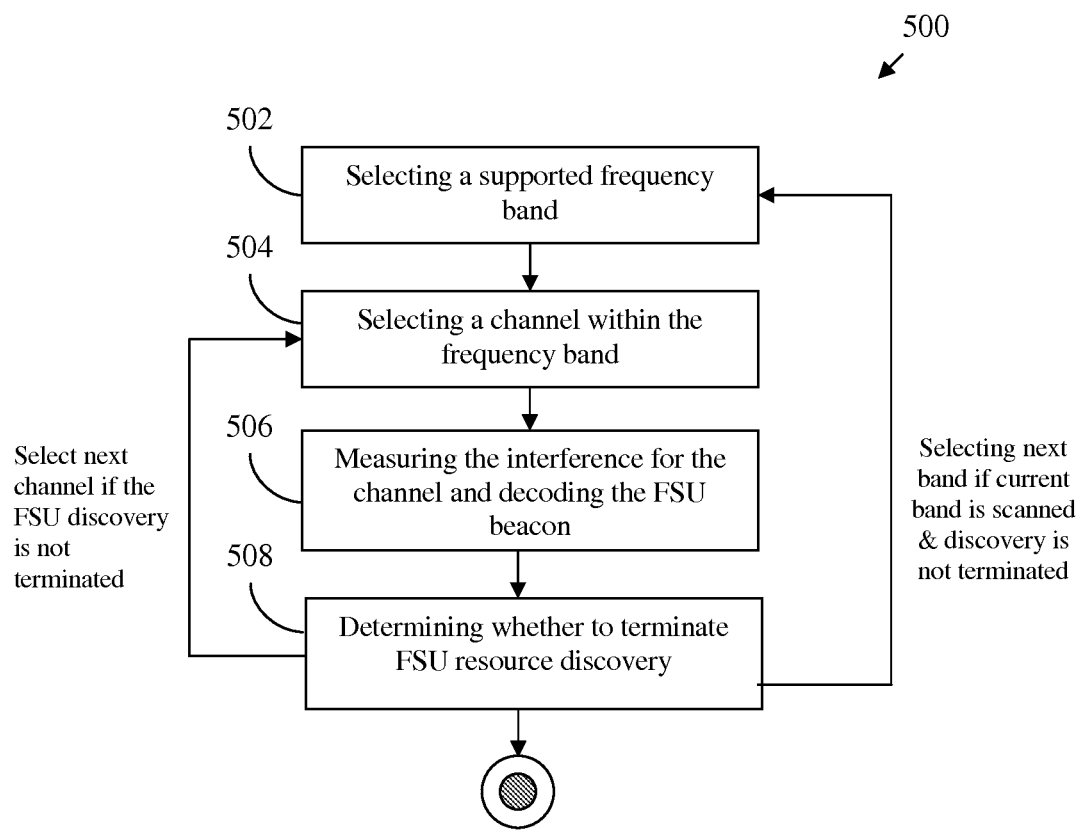
FIG. 5 illustrates an example method for FSU resource discovery in accordance with an example embodiment of the invention.

In one example embodiment, discovering FSU resources at block 208 may include dynamically scanning frequency channels within each supported frequency band to discover available channel until all channels are scanned. In another embodiment, different criteria may be used for terminating the process of discovering the FSU resources. For example, one alternative criterion is that a predetermined number of FSU resources are discovered. More details of the FSU resource discovery are illustrated in FIG. 5 and described hereafter.

In one example embodiment, signaling for service capabilities at block 206 may include maintaining spectrum reservation for communication such as D2D communication. Maintaining spectrum reservation for communication may include managing radio resources dynamically, allocating and releasing local spectrum depending on the need, avoiding local interference, controlling local interference, renewing resource reservations based on the locally available spectrum and communicating dynamic changes in the spectrum use. Communicating locally available spectrum change may further include managing coexistence of radio links at least in the shared space of time, frequency and code domains and managing beaconing devices. The FSU discovery may include means for detecting spectrum utilization in the local neighborhood, especially in the range of radio signal propagation which is different from the large-area radio spectrum allocations.

In one example embodiment, signaling for data exchange method at block 210 may include the D2D UE signaling the neighbor device to agree on a data exchange method. The data exchange method may include a type of radio, a type of ad hoc network and associated communication parameters. Also included in the data exchange method signaling may be the FSU resource used for data exchange. A more detailed illustration of signaling for data exchange method is found in FIG. 3 and described hereafter.

In one example embodiment, signaling for authentication at block 212 may include the D2D UE signaling the neighbor device to request for authentication and the neighbor device responding with a grant or denial included in an acknowledgment. Alternatively, the neighbor device may initiate authentication and the D2D UE may acknowledge with a grant or a denial. The step of authentication and association may be optional because authentication and association may have been performed in a previous session. In one example embodiment, initiating data exchange upon completing D2D session setup at block 214 may include sending the data with agreed data exchanged method using the allocated FSU resources.

Figure 8:
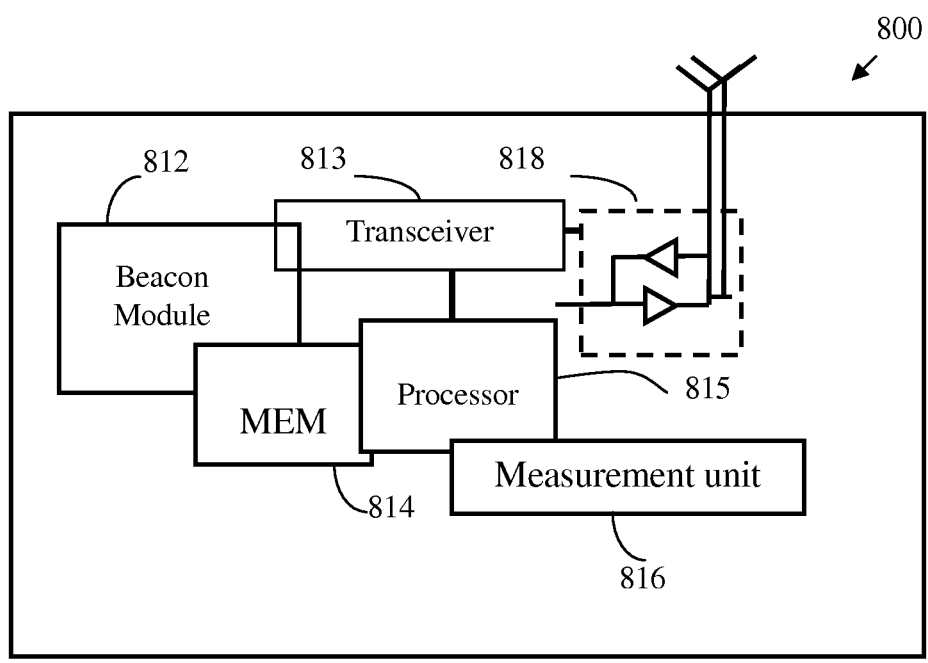
FIG. 8 illustrates an example wireless apparatus accordance with an example embodiment of the invention.

In one example embodiment, the method 200 may be implemented at any of the peer UEs 102a through 102c of FIG. 1 or at the apparatus 800 of FIG. 8. The method 200 is for illustration only and the steps of the method 200 may be combined, divided, or executed in a different order than illustrated, without departing from the scope of the invention of this example embodiment.

Figure 3:
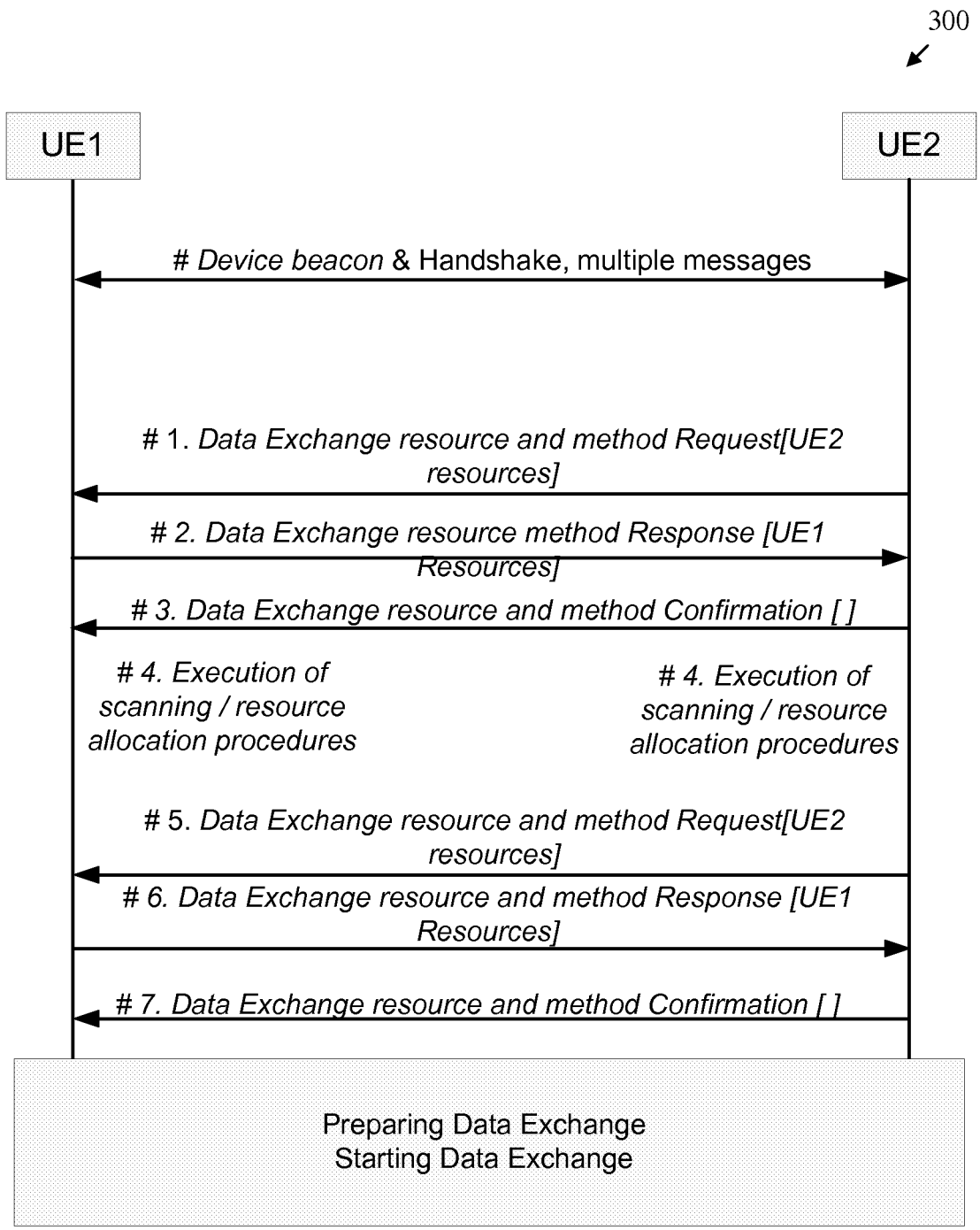
FIG. 3 illustrates an example FSU signaling diagram in accordance with an example embodiment of the invention.

FIG. 3 illustrates an example FSU signaling diagram 300 in accordance with an example embodiment of the invention. The signaling diagram illustrates that two peer D2D devices UE1 and UE2 initiates a D2D connection setup and are in process to exchange FSU resource information. Due to the dynamic nature of LAE and the need for self-organization, the peer D2D devices UE1 and UE2 may use the D2D beacon frame to carry more than beaconing signaling, and may carry application payloads and estimate the amount of resources that an application needs based on the signaling information exchanged between the peer D2D devices.

In one example embodiment, the two peer devices first go through device beaconing, multiple message exchanges and handshake to set up a connection between the two peer UEs. The two UEs may negotiate to elect a leader for deciding on the resource to be use for the session or an application. Different criteria may be used to decide which UE takes on the leader's role. One example criterion is that the UE which is communicating with most other active UEs may take on the leader's role. Another example criterion is that the D2D UE that has more resource available for data exchange takes on the leader's role. Another criterion may be that the UE with higher device ID takes on the leader's role. An alternative FSU leader election criterion is that the UE that hosts the service may operate as the decision maker and may select the applied FSU resources for the D2D link, if multiple alternative election criteria exist.

Step #1 of FIG. 3 indicates that a data exchange resource and method request beacon frame is sent from UE2 to UE1 to indicate the available resources at the UE2. The beacon frame may also propose a radio interface type, transmission topology such as a direct D2D communication or an access point assisted communication and a device role for the UE2 itself, the device role such as a leader or a peer D2D UE.

At step #2, a data exchange resources and method request response beacon frame is sent from the UE1 to the UE2 to indicate the available resources at the UE1 for the intended application and propose resources that may be used for the application. If the UE1 does not have sufficient resource for the application, the UE1 may indicate that it intends to perform additional scanning to discover more FSU resource as illustrated in FIG. 5. The UE1 may indicate a frequency spectrum that it intends to scan so that the UE2 may scan the same spectrum area.

At step #3, a data exchange resource and method confirmation message is sent from the UE2 to indicate to the UE1 that the UE2 intends to scan the indicated resources and continue the connection setup. The UE2 may also indicate the currently available resources to UE1. At step #4, both the UE1 and UE2 perform FSU resource discovery as illustrated in FIG. 5 and may discover and allocate available resource for the intended application. After the FSU discovery and allocation at both UE1 and UE2, the views of available resource at either or both UEs may change and thus the two UEs UE1 and UE2 may have a need to renegotiate the resource allocation. In one example embodiment, the UE1 remains in the leader role and makes a final decision on the FSU resource to be used.

At step #5, the UE1 and UE2 resume signaling for data exchange method after the FSU resource scanning and allocation at step #4 at both the UEs UE1 and UE2. The UE2 indicates its currently available resources to the UE1 in a data exchange resource and method request frame. At step #6, a data exchange resources and method response frame is sent from the UE1 to the UE2 to indicate again the available resources at the UE1; the UE1 may propose resources that may be used for the application. The UE1 may make a decision on the resource to be used for the application, operating as the decision maker. At step #7, a data exchange resource and method confirmation frame is sent from the UE2 to the UE1 to indicate that the UE2 consents to the resources allocation decided by the UE1 for the application and the UE1 and UE2 proceed to the data transmission phase.

The following two tables illustrate example signaling payload for the example FSU signaling as illustrated in FIG. 3. Table 1 illustrates the information elements for resource availability and suggested resource that may be included in the data exchange request and response frame or in data exchange method request and response frame. The suggested resource element may be optional if resources are available or awareness of local resource usage is available. The example band specifier may include the US TV white space bands, 2.4 GHz or 5 GHz license exempt bands or 3.4-3.8 GHz licensed bands.

TABLE 1

Information elements included in data exchange request and response or data exchange method request and response frame

| Resource availability | Suggested resource | |
|---|---|---|
| 0. No resources available and no information about resource usage in the neighborhood<br>1. Resources available for data exchange<br>2. Aware of resource usage in the neighborhood | Frequency band specifier:<br>4-8 bits to specify LAE operation bands | Frequency channel specifier:<br>The available channels (FSU resource units) are specified, in 10 MHz units |

Table 2 illustrates three information elements that may be included in an acknowledgement to the data exchange request/response or data exchange method request/response beacon frame: data exchange request response, error code and suggested resource. The suggested resource element may be optional if the resources are available or awareness of local resource usage is available.

TABLE 2

Information elements included in an acknowledgment to a data exchange request/response or data exchange method request or response

| Data Exchange Request Response | Error Code | Suggested resource | |
|---|---|---|---|
| 0. ACK to use one the resources suggested by | 0. Too many D2D associations, new | Band specifier:<br>4-8 bits needed to | Channel specifier<br>For each band the |

TABLE 2-continued

Information elements included in an acknowledgment to a data exchange
request/response or data exchange method request or response

| Data Exchange Request Response | Error Code | | Suggested resource |
|---|---|---|---|
| other device; Exact resources specified in Resource specifier part of message<br>1. NACK, No acceptable resources available, resource decision continues after X BOs and parameters for the scanning are provided.<br>2. NACK error code in optional field. This error indicates that responder is not continuing the setup process. | association is temporarily not possible, try again after n beacon opportunities.<br>1. Operation in provided frequency is not possible or desired (alternative resources can be specified in optional resource specifier fields)<br>2. Unspecified error | specify LAE operation band (e.g. US TV WS, 2.4 GHz license exempt band, 3.4-3.8 GHz band, 2.5 GHz TDD, 5 GHz license exempt band, . . .) | available channels (FSU resource units) are specified, e.g. 10 MHz units in 400 MHz band requires 40 bits |

Figure 4:
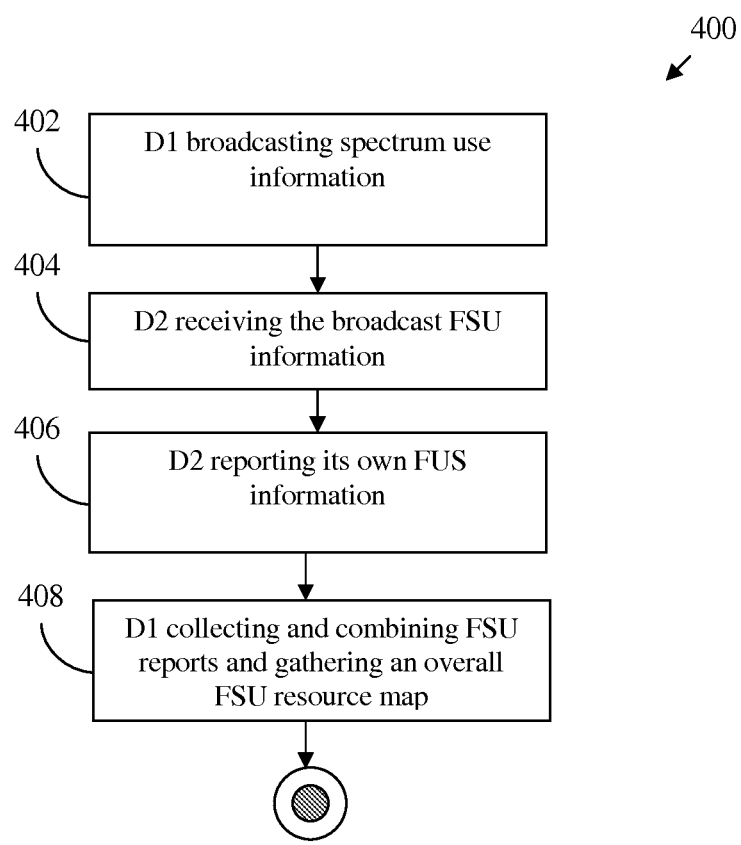
FIG. 4 illustrates an example flowchart for FSU resource information exchange in accordance with an example embodiment of the invention.

FIG. 4 illustrates an example flowchart 400 for FSU resource information exchange in accordance with an example embodiment of the invention. The flowchart 400 may involve two D2D devices D1 and D2 exchanging FSU information via FSU beaconing. In one example embodiment, the device D1 may be a base station or access point and the device D2 may be a UE. At block 402, the device D1 may broadcast the spectrum usage information for a given cell or a local area network. The broadcast information may also include an identifier of the device D1, reserved resource and coordination support.

At block 404, nearby UEs, such as the device D2, and other UEs may monitor and receive these broadcast beacons to collect the FSU information. At block 406 the device D2 may report its FSU resources to the device D1 after a FSU resource discovery process as illustrated in FIG. 5. In turn, the device D1 at block 408 may combine information from connected UEs to form a local awareness of the spectrum use in the entire cell or the local area network. Based on the local awareness, the device D1 may take action such as reserving more resources for the cell. In an alternative embodiment, the device D1 which has an Internet connection to a core network node may contact a support node with a database to get information about the FSU information in their current location. The support node may suggest a frequency band and a channel within the band to be used for data transmission. Multiple networks on the same band may coordinate their operation based on the FSU resource information exchanges.

FIG. 5 illustrates an example method 500 for FSU resource discovery in accordance with an example embodiment of the invention. The method 500 includes selecting a supported frequency band at block 502, selecting a channel within the selected frequency band at block 504, measuring the interference of the selected channel and optionally decoding the FSU beacon at block 506, and determining whether a predefined criterion is met to terminate the FSU discovery process at block 508.

In one example embodiment, selecting a supported frequency band at block 502 may include selecting one of the frequency bands supported at the D2D device. Examples of the frequency bands that a D2D device may support include license-exempt frequency bands such as 2.4 GHz and 5 GHz bands, TV white space bands, and one or more non-exempt frequency bands. If it is known to the D2D device that D2D peer device does not supports a particular frequency band, the D2D device may avoid scanning the frequency band.

In one example embodiment, selecting a channel within the selected frequency band at block 504 may include selecting a channel sequentially within the selected frequency band to determine whether the channel is available. A preferred set of frequency channels may be defined based on past selections or other criteria and the frequency channels from the preferred set may be selected first.

In one example embodiment, measuring the interference of the selected channel at block 506 may include taking measurements of the interference on the selected channel and determining whether the measured interference is within a predetermined level. If the interference level is within the predetermined level, the selected channel may become part of an available channel pool to be considered for the D2D session. Decoding the FSU beacon at block 506 is optional and may include decoding a received FSU beacon and extracting FSU information. The extracted FSU information may include one or more supported frequency bands, available channels, channel ranges and the like. Based on the FSU information from the peer D2D device, the D2D device may discover the FSU resource more efficiently with a focused target.

In one example embodiment, determining whether a criterion is met to terminate FSU resource discovery at block 508 may include selecting one of the criteria and checking whether the selected criterion is met for terminating the FSU resource discovery. One example criterion is to scan FSU resources until all supported bands and all channels within each supported band are scanned. Another example criterion is that a pre-determined number of available channels are discovered.

In one example embodiment, the method 500 may be implemented at any of the UEs 102a through 102c of FIG. 1 or at the apparatus 800 of FIG. 8 as part of the process of establishing a D2D connection. The method 500 is for illustration only and the steps of the method 500 may be combined, divided, or executed in a different order than illustrated, without departing from the scope of the invention of this example embodiment.

Figure 6:
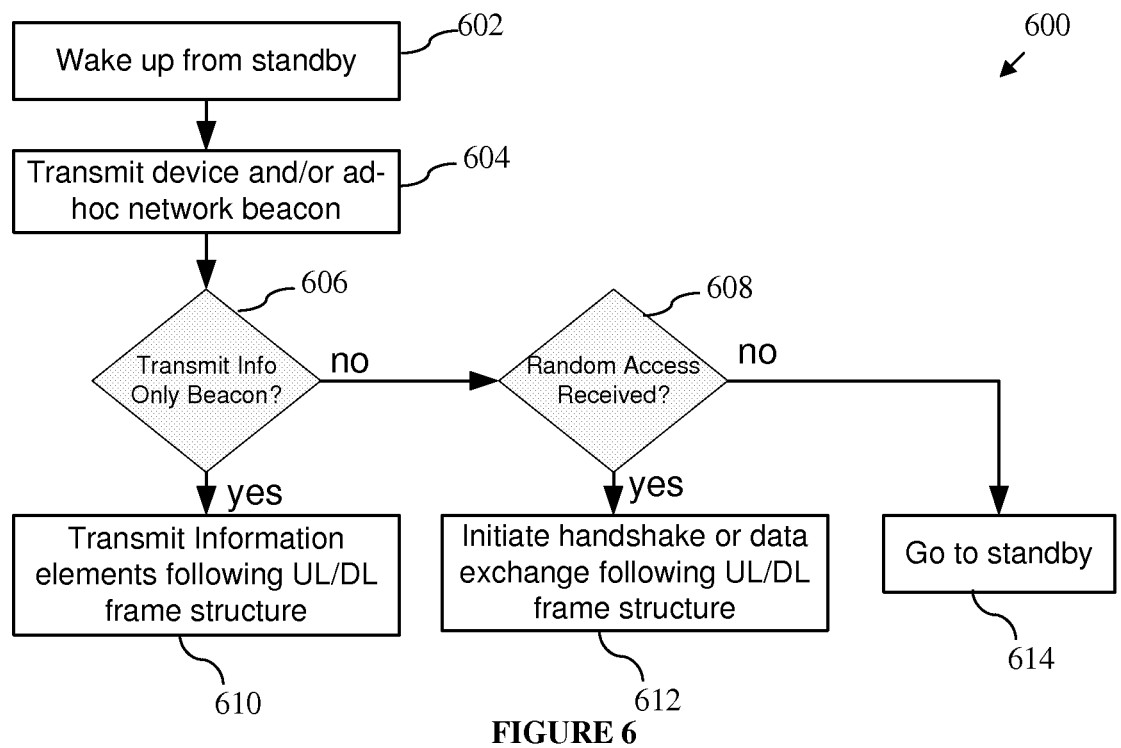
FIG. 6 illustrates example state transition diagram for a beaconing device in accordance with an example embodiment of the invention.
Figure 7:
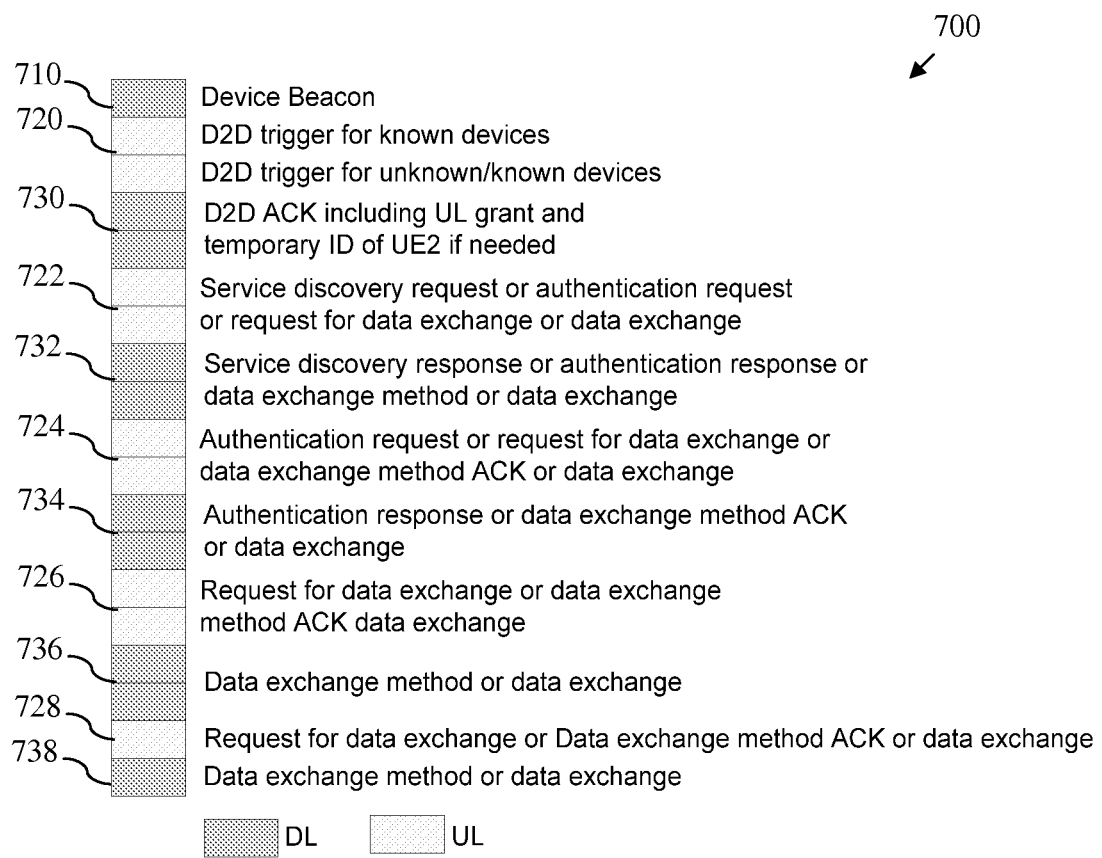
FIG. 7 illustrates an example beacon frame structure in accordance with an example embodiment of the invention.

FIG. 6 illustrates example state transition diagram 600 for a beaconing device in accordance with an example embodiment of the invention. The beaconing device may wake up from a standby state at block 602; this may be triggered by a user action such as pressing a button or a scheduled event at a fixed interval. The beaconing device may enter a beacon transmitting phase by transmitting a device beacon or ad hoc network beacon at block 604. The beaconing device may first decide the type of beacon to transmit, such as information only beacon or other type of beacons. The device may transmit information-only beacon at block 610 if it has only the beacon information to transmit. The information-only beacon may be transmitted at a predetermined interval and frequency. If the beaconing device has more than beacon information to transmit, and if a random access request from a neighbor device has been received by the beaconing device at block 608, the beaconing device at block 612 may initiate a handshake process with the neighbor device and optionally transmit data using uplink or downlink subframes as illustrated in FIG. 7. If this is not the case, the beaconing device may go back to the standby state at block 614. If the beaconing device does not receive any transmissions in response to the transmitted beacon during a random access channel cycle, it may return to a standby state or doze state since the intended operation is completed.

FIG. 7 illustrates an example beacon frame 700 in accordance with an example embodiment of the invention. The beacon frame comprises a beacon type field, a set of uplink beacon fields, and a set of downlink beacon fields for a D2D device to communicate with a peer D2D device. The beacon frame may be used to set up a D2D connection, to broadcast FSU information, to exchange data or any combination of the above. A beacon field may contain one or more beacon subfields, also termed subframes. The beacon type field 710 may indicate it is an information-only beacon, an inquiry-only beacon, a device beacon or an access-point-controlled beacon. The uplink beacon fields may include trigger fields 720 for known devices and unknown devices. If the D2D device already follows the beacons of a neighbor device, the D2D device is a "known" device because it knows the beacon transmission periodicity of the neighbor device and may not decode the beacon to avoid a subframe delay. In this case, two uplink subframes of the beacon field 720 may contain a random access channel. The first subframe of the beacon field 720 may be used by a "known" device that has already decoded the beacon before or is aware of the beacon periodicity of the neighbor device and the second subframe of the beacon field 720 may be used by either a known device or an unknown device.

The uplink beacon fields may also include a request field 722 for service discovery request, authentication request, or data exchange request, and an acknowledgement (ACK) field 724 for an authentication request ACK, a data exchange request ACK or data exchange method ACK. The uplink beacon fields also includes a field 726 comprising two subframes that may be used for data exchange request and data exchange method request ACK and, a field 728 comprising one subframe that may be used for data exchange request or data exchange method ACK. Any subframe of the beacon fields 722, 724, 726, 728 may be used to directly transmit data if the amount of data to be transmitted to the neighbor device is relatively small.

Similarly, a set of the downlink beacon fields include a field 730 comprising two subframes that may be used for D2D acknowledgement to uplink grant and a temporary ID of the peering device. Downlink beacon response fields 732 and 734 each comprising two subframes may be used for service discovery response, authentication response, data exchange method request or data exchange itself. Downlink beacon field 736 comprising two subframes may be used for data exchange method and data exchange itself. Downlink beacon field 738 comprising a single subframe may be used for data exchange method or data exchange. The downlink beacon fields and the uplink beacon fields are interleaved in such a way that a number of uplink subframes are followed immediately by an equal number of downlink subframes.

In another example embodiment, the D2D device may use the downlink subframes 730 to respond to the requests from peer D2D devices. The two subframes of the uplink beacon field 722 may be reserved for handshake signaling if there is a need. In a case where the D2D device has only little data to send, it may directly send the data to the peer D2D device after an optional service discovery and an optional authentication signaling, using the subframe of the uplink beacon field 728. If the D2D device already knows the services offered by the neighbor device, or it has been authenticated before, the service discovery or authentication procedure may be avoided. For example in a home network comprising devices with fixed locations, the authentication process will likely happen only for the initial set-up of the home network.

In one example embodiment, the beacon frame 700 may also be used to help maintain a D2D association between D2D devices. For example, the two D2D devices may use some of the subframes to share the knowledge that other device is present and keeps the association from expiring. The beacon frame 700 may also be used to carry small amount of data between devices and set the minimum limit for stand-by power consumption. In one example embodiment, the subframes of the uplink beacon field 726 and the subframes of the beacon field 738 may be used to support signaling negotiation for the FSU resources.

FIG. 8 is a block diagram illustrating an example wireless apparatus 800 for implementing the beaconing for D2D communication in accordance with an example embodiment of the invention. In FIG. 8, the wireless apparatus 800 may include a processor 815, a memory 814 coupled to the processor 815, and a suitable transceiver 813 (having a transmitter (TX) and a receiver (RX)) coupled to the processor 815, coupled to an antenna unit 818. The memory 814 may store programs such as a beacon module 812. The wireless apparatus 800 may be at least part of a $4^{th}$ generation mobile station, an access point and a LTE compliant base station.

The processor 815 or some other form of generic central processing unit (CPU) or special-purpose processor such as digital signal processor (DSP), may operate to control the various components of the wireless apparatus 800 in accordance with embedded software or firmware stored in memory 814 or stored in memory contained within the processor 815 itself. In addition to the embedded software or firmware, the processor 815 may execute other applications or application modules stored in the memory 814 or made available via wireless network communications. The application software may comprise a compiled set of machine-readable instructions that configures the processor 815 to provide the desired functionality, or the application software may be high-level software instructions to be processed by an interpreter or compiler to indirectly configure the processor 815.

In an example embodiment, the beacon module 812 may be configured to broadcast a beacon comprising an OFDM beacon frame comprising a beacon type field, a set of uplink fields and a set of downlink fields. The uplink beacon fields and downlink beacon fields are interleaved in such a way that a number of uplink beacon subframes are followed by an equal number of downlink beacon subframes. The beacon module 812 may be configured to receive at least one random access request from at least one neighbor device to trigger a handshake signaling session. The handshake signaling session may be used to establish a D2D connection, and to respond to the random access request with a D2D beacon acknowledgement including an identifier of the D2D UE. The beacon module 812 may also be configured to discover available FSU resources and report to the neighbor device information on the available FSU channels in a data exchange method message.

As shown in FIG. 8, the wireless apparatus 800 may further include a measurement unit 816, which measures the signal strength level that is received from another wireless device, and compare the measurements with a configured threshold. The measurement unit may be utilized by the wireless apparatus 800 in conjunction with various exemplary embodiments of the invention, as described herein.

In general, the various exemplary embodiments of the wireless apparatus 800 may include, but are not limited to, part of a user equipment, or a wireless device such as a portable computer having wireless communication capabilities, Internet appliances permitting wireless Internet access and browsing, as well as portable units or terminals that incorporate combinations of such functions. In one embodiment, the wireless apparatus 800 may be implemented in one of the UEs 102a through 102c of FIG. 1a.

Disclosed herein are a flexible spectrum usage (FSU) resource scheme and an OFDM beacon frame structure as used in a D2D handshake process to establish a D2D connection. The FSU resource scheme includes a FSU discovery method to detect spectrum utilization in the local neighborhood, especially in the range of radio signal propagation. The FSU scheme includes also FSU beaconing that maintains and manages spectrum reservation for communication. The FSU beaconing scheme includes communication of dynamical management of the radio resources including local spectrum reservation allocation, allocation renewal and release, and local interference control and avoidance. The spectrum detection and the FSU beacons provide means to communicate dynamic changes in the spectrum use and to manage coexistence of radio links at least in the shared space of time, frequency and code domains. The FSU beacon information is exchanged in OFDM beacon frame which includes a plurality of uplink and downlink beacon fields arranged in a way that facilitates the D2D connection setup and the FSU resource discovery and allocation.

Without in any way limiting the scope, interpretation, or application of the claims appearing below, a technical effect of one or more of the example embodiments disclosed herein is efficient device beaconing and handshake to enable direct communication between D2D devices. Another technical effect is discovery of FSU resources to enable efficient allocation of resources in a dynamic network environment, which in turn saves energy and provides holistic view of the available resources in a D2D network.

Embodiments of the present invention may be implemented in software, hardware, application logic or a combination of software, hardware and application logic. The software, application logic and/or hardware may reside on a user equipment, a base station or an access point. If desired, part of the software, application logic and/or hardware may reside on access point, part of the software, application logic and/or hardware may reside on a network element such as a UE, and part of the software, application logic and/or hardware may reside on a peer network element such as a base station or an access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   broadcasting from a user equipment (UE) a beacon comprising a beacon flame comprising a plurality of beacon fields;
   receiving in response to the beacon at least one request from at least one neighbor device to trigger handshake signaling to establish a device to device (D2D) connection;
   responding to one of the at least one request including at least an identifier of the UE to confirm the D2D connection with the neighbor device;
   discovering available resources from the beacon;
   obtaining from the beacon at least one of a spectrum usage status and a priority for the available resources; and
   exchanging information on the discovered available resources in the handshake signaling with the neighbor device,
   wherein the available resource is an FSU resource and further comprising:
   receiving a flexible spectrum usage (FSU) beacon from the neighbor device; and
   decoding the received FSU beacon if a periodicity of the FSU beacon is unknown, and
   wherein discovering the available resources further comprises:
   a) selecting a supported frequency band;
   b) scanning each of frequency channels within the selected frequency band;
   c) measuring an interference for the selected channel;
   d) identifying the selected channel as an available FSU candidate channel if the measured interference meets a specified criterion; and
   e) repeating steps a) though d) until a termination criterion is met;
   wherein exchanging with the neighbor device the information of the discovered available resources further comprises exchanging network type information.

2. The method of claim 1, wherein information on the discovered available resources includes an awareness of resource usage in the neighborhood.

3. The method of claim 1, wherein information on the discovered available resources includes a response that there are no acceptable resources available.

4. A method comprising:
broadcasting from a user equipment (UE) a beacon comprising a beacon frame comprising a plurality of beacon fields;
receiving in response to the beacon at least one request from at least one neighbor device to trigger handshake signaling to establish a device to device (D2D) connection;
responding to one of the at least one request including at least an identifier of the UE to confirm the D2D connection with the neighbor device;
discovering available resources from the beacon;
obtaining from the beacon at least one of a spectrum usage status and a priority for the available resources; and
exchanging information on the discovered available resources in the handshake signaling with the neighbor device,
wherein the available resource is an FSU resource and further comprising:
receiving a flexible spectrum usage (FSU) beacon from the neighbor device; and
decoding the received FSU beacon if a periodicity of the FSU beacon is unknown, and
wherein the beacon frame comprises a beacon type field, a plurality of uplink beacon fields and a plurality of downlink beacon fields, each of the uplink beacon fields and downlink beacon fields comprises one or more beacon subframes, and the plurality of uplink beacon fields and the plurality of downlink beacon fields are interleaved in such a way that a number of the uplink beacon subframes is followed immediately by an equal number of downlink beacon subframes.

5. The method of claim 4 wherein the uplink beacon fields comprise at least a D2D trigger field for known devices and unknown devices, a request field for at least one of a service discovery, an authentication, and a data exchange method and an acknowledgment (AC) field for at least one of a service discovery request, an authentication request, and a data exchange method request, wherein the data exchange method field is configured to represent the discovered FSU resources.

6. The method of claim 4 wherein the downlink beacon fields comprise at least an uplink grant field and a temporary device identifier field, a response field for at least one of a service discovery request, an authentication request, and a data exchange method request, and at least one data exchange field.

7. The method of claim 6, further comprising negotiating with the neighbor device
to elect between the D2D UE and the neighbor device a leader to decide which one of the discovered FSU resources to use, based on one of selection criteria, wherein the selection criteria include a higher number of active connections, a higher number of available resources, and a higher identifier number;
to select one of the D2D UE and the neighbor device to provide resources for the D2D connection and to maintain the resources through FSU beaconing based on the selection criterion; and
to select one of the D2D UE and the neighbor device to advertise services to use among multiple alternatives.

8. The method of claim 6, further comprising
one of
sending a D2D service discovery request to the neighbor device, and
responding to a neighbor D2D service discovery request with a set of service capabilities included in a service discovery request ACK beacon subframe; and
one of
sending an authentication request to the neighbor device; and
responding to a neighbor authentication request with an authentication grant included in an authentication request ACK beacon field.

9. An apparatus comprising:
at least one processor; and
at least one memory including computer program code,
the at least one memory and the computer program code configured to, with the at least one processor, cause the apparatus to perform at least the following:
broadcasting from a device to device (D2D) user equipment (UE) a beacon comprising a beacon frame comprising a plurality of beacon fields;
discovering available flexible spectrum usage (FSU) resources;
exchanging with the neighbor device information of the discovered available FSU resources;
receiving in response to the beacon at least one request from at least one neighbor device to trigger a handshake signaling session to establish a D2D connection; and
responding to one of the at least one request including at least its own identifier to establish the D2D connection with the neighbor device,
wherein the beacon frame comprises a beacon type field, a plurality of uplink beacon fields and a plurality of downlink beacon fields.

10. The apparatus of claim 9, wherein the at least one memory and the computer program code are configured to, with the at least one processor, cause the apparatus to perform at least one of:
receiving a FSU beacon from the neighbor device;
decoding the received FSU beacon if a periodicity of the FSU beacon is unknown;
obtaining at least a spectrum usage status and a priority for each of the FSU resources from the decoded FSU beacon; and
coordinating with one or more neighbor devices in discovering available FSU resources, including assigning a frequency area to one of the neighbor devices, collecting results of frequency scanning, and arriving at an overall a view of the available FSU resources.

11. The apparatus of claim 9, wherein each of the beacon fields comprises one or more beacon subframes and the plurality of uplink beacon fields and the plurality of downlink beacon fields are interleaved in such a way that a number of uplink beacon subframes is followed immediately by an equal number of downlink beacon subframes.

12. The apparatus of claim 11 wherein the plurality of the uplink beacon fields comprise at least a D2D trigger field for known devices and unknown devices, a request field for at least one of a service discovery, an authentication, and a data exchange method and an acknowledgment (AC) field for at least one of a service discovery request, an authentication request, and a data exchange method request; and the plurality of downlink beacon fields comprise at least an uplink grant field and a temporary device identifier field, a response field for at least one of a service discovery request, an authentication request, and a data exchange method request, and at least one data exchange field.

13. The apparatus of claim 9, wherein information on the discovered available resources includes an awareness of resource usage in the neighborhood.

14. The apparatus of claim 9, wherein information on the discovered available resources includes a response that there are no acceptable resources available.

15. A method comprising:
  receiving at a device to device (D2D) user equipment (UE) a beacon comprising a beacon frame;
  sending a random access request to the neighbor device to trigger a handshake signaling session to establish a D2D connection;
  discovering available flexible spectrum usage (FSU) resources; and
  exchanging with the neighbor device information of the discovered available FSU resources,
  wherein the beacon frame comprises a beacon type field, a plurality of uplink beacon fields and a plurality of downlink beacon fields, each of beacon filed comprises one or more beacon subframes, and the plurality of uplink beacon fields and the plurality of downlink beacon fields are arranged in such a way that a number of uplink beacon subframes is followed immediately by an equal number of downlink beacon subframes.

16. The method of claim 15 wherein the plurality of the uplink beacon fields comprise at least a D2D trigger field for known devices and unknown devices, a request field for at least one of a service discovery, an authentication, and a data exchange method and an acknowledgment (AC) field for at least one of a service discovery request, an authentication request, and a data exchange method request and the plurality of downlink beacon fields comprise at least an uplink grant field and a temporary device identifier field, a response field for at least one of a service discovery request, an authentication request, and a data exchange method request, and at least one data exchange field.

17. A method comprising:
  broadcasting from a device to device (D2D) user equipment (UE) a beacon comprising a beacon frame comprising a plurality of beacon fields;
  discovering available flexible spectrum usage (FSU) resources;
  exchanging with the neighbor device information of the discovered available FSU resources;
  receiving in response to the beacon at least one request from at least one neighbor device to trigger a handshake signaling session to establish a D2D connection; and
  responding to one of the at least one request including at least its own identifier to establish the D2D connection with the neighbor device,
  wherein the beacon frame comprises a beacon type field, a plurality of uplink beacon fields and a plurality of downlink beacon fields.

18. The method of claim 17, further comprising at least one of:
  receiving a FSU beacon from the neighbor device;
  decoding the received FSU beacon if a periodicity of the FSU beacon is unknown;
  obtaining at least a spectrum usage status and a priority for each of the FSU resources from the decoded FSU beacon; and
  coordinating with one or more neighbor devices in discovering available FSU resources, including assigning a frequency area to one of the neighbor devices, collecting results of frequency scanning, and arriving at a view of the available FSU resources.

19. The method of claim 17, wherein each of the beacon fields comprises one or more beacon subframes and the plurality of uplink beacon fields and the plurality of downlink beacon fields are interleaved in such a way that a number of uplink beacon subframes is followed immediately by an equal number of downlink beacon subframes.

20. The method of claim 19 wherein the plurality of the uplink beacon fields comprise at least a D2D trigger field for known devices and unknown devices, a request field for at least one of a service discovery, an authentication, and a data exchange method and an acknowledgment (AC) field for at least one of a service discovery request, an authentication request, and a data exchange method request; and the plurality of downlink beacon fields comprise at least an uplink grant field and a temporary device identifier field, a response field for at least one of a service discovery request, an authentication request, and a data exchange method request, and at least one data exchange field.

* * * * *